US009135610B2

(12) United States Patent
Dwivedi et al.

(10) Patent No.: US 9,135,610 B2
(45) Date of Patent: Sep. 15, 2015

(54) SOFTWARE APPLICATION LICENSE ROAMING

(75) Inventors: Sanjeev Dwivedi, Sammamish, WA (US); Sunil Kadam, Redmond, WA (US); Ziquan Li, Redmond, WA (US); Alwin Vyhmeister, Seattle, WA (US); Ariye M. Cohen, Bellevue, WA (US); Varun Eda Naarayana Kulothungan, Bellevue, WA (US); Saurabh Boyed, Bothell, WA (US); Aravind Aluri, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 720 days.

(21) Appl. No.: 13/074,029

(22) Filed: Mar. 29, 2011

(65) Prior Publication Data
US 2012/0254047 A1    Oct. 4, 2012

(51) Int. Cl.
*G06F 21/00* (2013.01)
*G06Q 20/12* (2012.01)
*G06F 21/10* (2013.01)

(52) U.S. Cl.
CPC ............ *G06Q 20/1235* (2013.01); *G06F 21/10* (2013.01); *G06F 21/105* (2013.01); *G06Q 2220/18* (2013.01)

(58) Field of Classification Search
CPC .......... G06Q 20/1235; G06Q 2220/18; G06F 21/10; G06F 21/105
USPC ........................................................ 705/59
See application file for complete search history.

(56) References Cited

U.S. PATENT DOCUMENTS

| 5,742,757 | A | 4/1998 | Hamadani et al. |
| 5,790,664 | A | 8/1998 | Coley et al. |
| 6,499,035 | B1 * | 12/2002 | Sobeski ................................ 1/1 |
| 7,203,966 | B2 | 4/2007 | Abburi et al. |
| 7,483,860 | B2 | 1/2009 | Cronce et al. |
| 7,603,318 | B1 * | 10/2009 | Colosso et al. ................. 705/59 |
| 7,890,428 | B2 * | 2/2011 | Brooks et al. ................... 705/59 |
| 7,890,950 | B1 * | 2/2011 | Nanavati et al. ............. 717/174 |
| 7,900,246 | B1 * | 3/2011 | Xu et al. ............................ 726/9 |
| 7,962,424 | B1 * | 6/2011 | Colosso et al. ................. 705/50 |
| 8,229,856 | B1 * | 7/2012 | Reddick .......................... 705/50 |
| 2002/0152393 | A1 * | 10/2002 | Thoma et al. ................. 713/189 |

(Continued)

OTHER PUBLICATIONS

Dalheimer, et al., "GenLM: License Management for Grid and Cloud Computing Environments", Retrieved at << http://ieeexplore.ieee.org/stamp/stamp.jsp?tp=&arnumber=5071864 >>, 9th IEEE/ACM International Symposium on Cluster Computing and the Grid, CCGrid, May 18-21, 2009, pp. 132-139.

(Continued)

*Primary Examiner* — Steven Kim
(74) *Attorney, Agent, or Firm* — Timothy Churna; Kate Drakos; Micky Minhas (57) ABSTRACT

A master license entry that links a software application to a user identification can be made. Application licenses to use the software application can be roamed to multiple computing machines. Feature licenses for added features of the software application can be roamed to those computing machines as well. Multiple overlapping license rights for the software application may be linked to the master license entry. A count of how many license rights for the software application are linked to the master license entry can be maintained. Requests for licenses may be refused if the count of license rights has reached zero.

20 Claims, 5 Drawing Sheets

(56) References Cited

U.S. PATENT DOCUMENTS

| | | | |
|---|---|---|---|
| 2003/0041125 A1* | 2/2003 | Salomon | 709/220 |
| 2003/0084306 A1* | 5/2003 | Abburi et al. | 713/188 |
| 2004/0172533 A1 | 9/2004 | DeMello et al. | |
| 2005/0289072 A1* | 12/2005 | Sabharwal | 705/59 |
| 2006/0031844 A1* | 2/2006 | Dice et al. | 718/106 |
| 2006/0179002 A1* | 8/2006 | Brooks et al. | 705/59 |
| 2006/0224520 A1* | 10/2006 | Vijay et al. | 705/59 |
| 2007/0005504 A1* | 1/2007 | Chen et al. | 705/59 |
| 2007/0014397 A1* | 1/2007 | Ukeda et al. | 380/30 |
| 2007/0016532 A1* | 1/2007 | Zhang et al. | 705/59 |
| 2007/0219917 A1* | 9/2007 | Liu et al. | 705/59 |
| 2008/0027868 A1* | 1/2008 | Ljung et al. | 705/51 |
| 2008/0083025 A1 | 4/2008 | Meijer et al. | |
| 2008/0101766 A1* | 5/2008 | Shimizu et al. | 386/96 |
| 2008/0103977 A1* | 5/2008 | Khosravy et al. | 705/59 |
| 2009/0106818 A1* | 4/2009 | Burkhardt et al. | 726/1 |
| 2009/0151006 A1* | 6/2009 | Saeki et al. | 726/28 |
| 2010/0293622 A1* | 11/2010 | Nikitin et al. | 726/31 |
| 2011/0196793 A1* | 8/2011 | Zheng et al. | 705/50 |

OTHER PUBLICATIONS

"EasyWorship Licences", Retrieved at << http://www.onlinemmi.com/eyedrops/EasyWorship/ew_licences.htm >>, Updated Apr. 20, 2008, pp. 2.

Zhu, et al., "Content and License Roaming for eHome DRM Applications", Retrieved at << http://www.cs.missouri.edu/~zengw/CCNC05DRM/DRMWorkshop_zhu.pdf >>, Jan. 25, 2005, pp. 1-20.

* cited by examiner

SOFTWARE APPLICATION LICENSE ROAMING

BACKGROUND

In a typical software application licensing scenario, a user purchases license rights that allow the user to use a software product. Many such license rights only allow use of the software on a single computing machine at a time. Other license rights allow the use of the software on multiple computing machines at the same time. However, even in situations where use on multiple machines is allowed, a user typically manually enters information such as a product key on each machine.

SUMMARY

The tools and techniques discussed below allow for roaming of application licenses and/or feature licenses. As used herein, an application license is a data structure indicating that an application can be used. A feature license is a data structure indicating that one or more features of an application can be used (e.g., the feature license may "unlock" the corresponding features). Roaming of a license includes sending a license to a machine, the license being linked to a master license entry. A master license entry is one or more computer entries that link one or more licenses (application and/or feature licenses) for a software application to a user identification. For example, a user identification may be a username, email address, etc. As used herein, linking of licenses, user identifications, master license entries, etc. refers to the linked items being associated with by one or more computer data items, such as one or more identifying references, a pointer to an address for the linked item in memory or storage, etc. Such links may be direct or indirect. For example, a master license entry can be said to link an application to a user identification by including an identifying reference for the application as well as a pointer to a location in memory that includes an identifying reference for the user identification.

In one embodiment, the tools and techniques can include making a master license entry that links a software application to a user identification. Application licenses to use the software application can be roamed to multiple computing machines. A request for a license for an added feature of the software application can be received. The added feature can be one that was not allowed by the master license entry prior to receiving the request. However, the added feature can be linked to the master license entry in response to the request. Moreover, feature licenses for the added feature can be roamed to the machines to which the application licenses are roamed.

In another embodiment of the tools and techniques, a master license entry that links a software application to a user identification can be made. Multiple overlapping license rights for the software application can be linked to the master license entry. A count of how many license rights for the software application are linked to the master license entry can be maintained. A request for a license for the software application can be received from a computing machine linked to the user identification. In response to the request, it can be determined whether the request is allowable. This determination can include determining whether the count of license rights for the software application is greater than zero. If the request is determined to be allowable, then a license for the software application can be roamed to the computing machine in response to the request. If the request is not determined to be allowable, then such roaming of a license to the computing machine can be refused.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved licensing of software applications. Such improvements may result from the use of various techniques and tools separately or in combination.

Such techniques and tools may include roaming application licenses and/or feature licenses to multiple machines that are linked to a user identification. The licensing system can track multiple license rights that are linked to the user identification, and can issue licenses for new machines so long as the system determines that requests for licenses allowable according to rules that can inhibit abuse of the license rights (e.g., there is still at least one license right for the subject software application linked to the user identification, the application has not been licensed on too many machines linked to the user identification, etc.). For example, when a user logs on to a new machine using an accepted login and identifies the machine as a machine owned by the user, a licensing client on the machine can automatically connect to a licensing server and download licenses for all the applications for which master license entries are linked to the login identification of the user. However, downloading of the licenses can be refused if the licensing server determines this attempt to obtain license(s) is not properly authorized or suspicious behavior on part of the user is detected. The licensing server can track the number of license rights (e.g., a user may have purchased multiple rights for an application, such as by purchasing rights separately and as part of a bundle) a user has to an application (e.g., those license rights that are linked to the user's user identification). The licensing server can keep roaming licenses to machines linked to the user until the active license count reaches zero (assuming other conditions are met—e.g., licenses are not roamed to too many machines).

Accordingly, one or more substantial benefits can be realized from the tools and techniques described herein. For example, an application license can be roamed to multiple machines while detecting abuse and piracy and taking actions against them. Accordingly, a user can be allowed to use his/ her application in various places on various computing machines, while still mitigating abuse of license rights.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
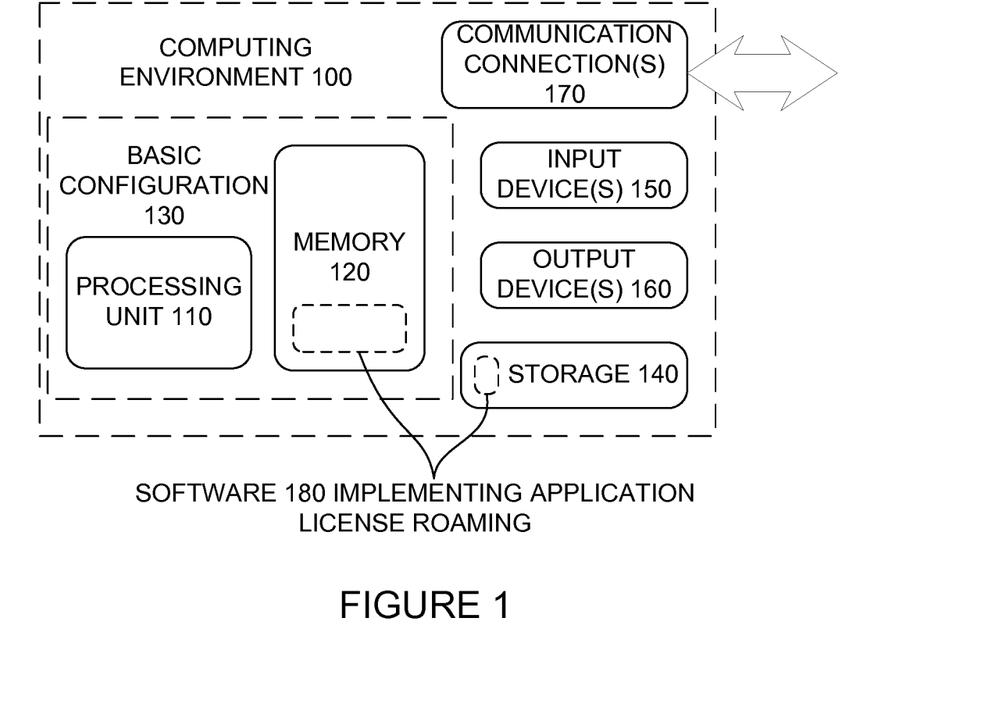
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a client computing machine, as a licensing server, and/or as an application store. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and at least one memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The at least one memory (120) may be volatile memory (e.g., registers, cache, RAM), non-volatile memory (e.g., ROM, EEPROM, flash memory), or some combination of the two. The at least one memory (120) stores software (180) implementing application license roaming.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing machine," "machine," "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Application License Roaming System and Environment

Figure 2:
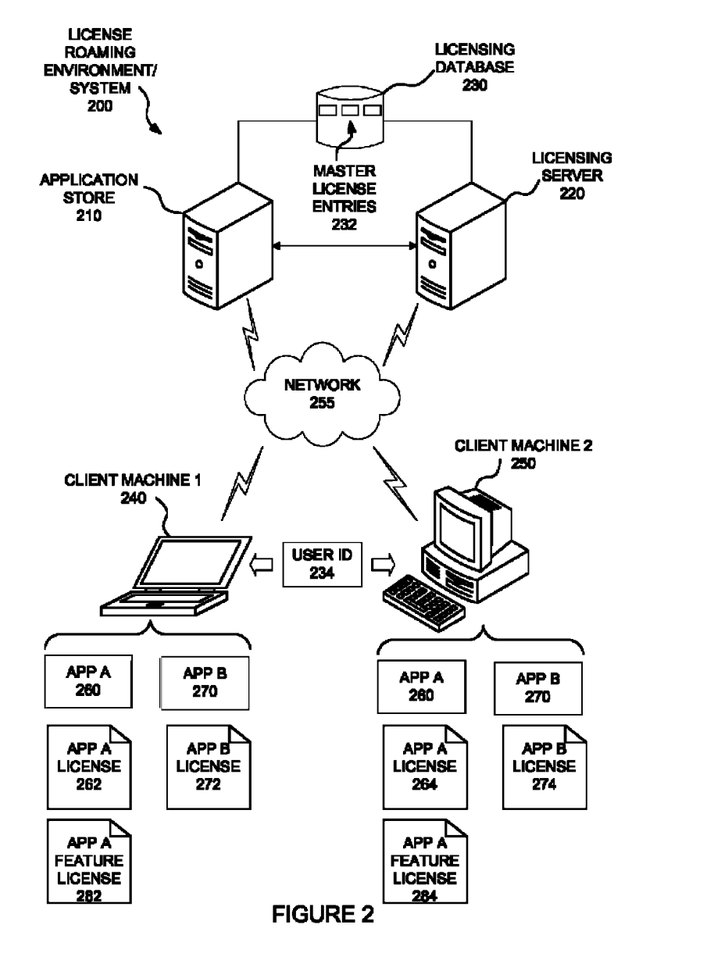
FIG. 2 is a block diagram of an application license roaming system or environment.

FIG. 2 is a block diagram of an application license roaming system or environment (200). The environment (200) can include an application store (210) and a licensing server (220), which could be implemented as separate servers or combined in a single server. The application store (210) and the licensing server (220) can communicate with each other in one or more of various ways, such as sending messages, having common access to a licensing database (230), etc. The application store (210) can allow applications to be purchased, and the licensing server (220) can provide licenses for the purchased applications. The licensing database (230) can include master license entries (232). Each master license entry (232) can link a licensed application with a user identification (234). Client machines (240 and 250) can communicate with the application store (210) and the licensing server (220) over a computer network (255). For example, the network (255) may be a global computer network such as the Internet, and/or some other type of network.

The client machines (240 and 250) can have applications (260 and 270) installed on them. For example, such applications may have been pre-installed, or they may have been downloaded after being purchased from the application store (210). In any event, license rights for the applications (260 and 270) can be purchased from the application store (210). As used herein, "purchase" of license rights can include obtaining license rights in various types of transactions, whether or not those rights are obtained in exchange for money (e.g., licenses may be obtained for free or in exchange for something other than money). When a license right is purchased from the application store (210), the application store can cause a master license entry (232) to be entered in the licensing database. The master license entry can link a user identification (234) with an application (260 or 270) that is licensed.

The licensing server (220) can provide application licenses (262, 272, 264, and 274) to the client machines. The application licenses (262, 272, 264, and 274) can each be bound to a particular client machine (240 or 250). As used herein, binding refers to having one or more features that inhibit attempts to use the license on machines other than the one(s) to which the license is bound. For example, this binding may use a hardware identifier, as will be discussed more below. In the illustration of FIG. 2, an Application A license (262) is a license for Application A (260), and the Application A license (262) is bound to Client Machine 1 (240) to inhibit use of the Application A license (262) on machines other than Client Machine 1 (240). Similarly, another Application A license (264) is an application license for Application A (260) that is bound to Client Machine 2 (250). Likewise, an Application B license (272) is an application license for Application B (270) that is bound to Client Machine 1 (240); and another Application B License (274) is an application license for Application B (270) that is bound to Client Machine 2 (250).

A. Roaming Licenses for Applications

In the environment (200), licenses can be roamed across machines. Following is an example of how license rights for an application can be purchased from one client machine, and licenses to the application can be roamed to that client machine and to another client machine, i.e., roamed across client machines.

1. Purchasing and Roaming Application Licenses to a First Machine

Client Machine 1 (240) can launch a store client, such as in response to user input. The store client can display a catalog of applications that can be purchased from the application store (210). Once a desired application—Application B (270) in this example—is located, user input can be received at Client Machine 1 (240) to select the application for downloading and installation (if it has not already been downloaded and/or installed). In response, Client Machine 1 (240) can provide a prompt for logon information linked to a user identification, if such logon information has not already been received. For example, the logon information may be information connected to an existing user identification (e.g., a Windows Live® identification).

Application B (270) may be free, or it may cost money. If Application B (270) costs money, payment information such as credit card information can be received from user input at Client Machine 1 (240). The store client on Client Machine 1 (240) can send the payment information to the application store (210), and the application store (210) can link the payment information to the user identification (234). Typical privacy and security safeguards (encryption, secure communications, etc.) can be used to protect payment information and other sensitive information linked to the user identification (234).

After the application store (210) has received payment (if Application B (270) costs money) or a request to install and activate Application B (270) (if Application B (270) is free), the application store (210) can create a master license entry (232) that links Application B (270) to the user identification (234). For example, the master license entry (232) may be a database entry or some other type of data structure.

Additionally, the store client on Client Machine 1 (240) can generate a hardware identification for Client Machine 1 (240). Such a hardware identification can be used to identify Client Machine 1 (240) and to distinguish Client Machine 1 (240) from other computing machines. For example, hash values can be produced from characteristics of multiple hardware components of Client Machine 1 (240). For example, serial numbers may be used for some components, and other characteristics (e.g., amount of memory or storage, processing speed, etc.) may be used for other components. Different logic can be used for generating hash values for different components. In one example, hash values from characteristics of ten or more components of Client Machine 1 (240) may be combined to produce the hardware identification for Client Machine 1 (240).

The store client on Client Machine 1 (240) can request a license for Application B (270) from the licensing server (220). In the request, Client Machine 1 (240) can include identification information, such as an application identification for Application B (270), the user identification (234), and the hardware identification for Client Machine 1 (240). When the licensing server (220) receives the license request, the licensing server (220) can verify information before fulfilling the request. For example, the licensing server (220) can verify that the user identification (234) connected to the request is linked to active licensing rights for Application B (270). For example, this may be done by the licensing server (220) searching for a master license entry (232) that links the user identification (234) to Application B (270). The licensing server (220) can also verify that the account linked to the user identification (234) is in good standing. Additionally, the licensing server (220) may verify that the limit of actively licensed machines for the user identification (234) has not already been reached. For example, a given user identification (234) may only be allowed to have active application licenses from the licensing server (220) on five machines at a time.

If the verification by the licensing server (220) succeeds, the licensing server (220) can generate a license (272) for Application B (270) that is only valid for the hardware identification for Client Machine 1 (240), which was sent with the license request. The licensing server (220) can sign the Application B license (272) and send it over the network (255) to Client Machine 1 (240).

When Client Machine 1 (240) receives the Application B license (272), the store client on Client Machine 1 (240) can verify that the license is signed by a trusted certificate, and that the Application B license (272) matches the current machine's hardware identification. If the hash values in the hardware identification of the current hardware and the license do not match exactly, then the store client on Client Machine 1 (240) can determine whether the hardware identifications are different enough that the current Client Machine 1 (240) should be considered a different machine from the machine used to create the hardware identification for the Application B license (272). In this matching technique, each hash for a component on a machine can be given a weight for weighting the component's use in determining whether two hardware identifications match. The weighted values can be used to determine whether the difference between the hardware identifications is significant enough that the current Client Machine 1 (240) is to be considered a different machine from the one used to generate the hardware identification for the Application B license (272).

If the store client determines that the license was not signed by a trusted certificate, or if the hardware identifications do not match, then the store client can raise an error message. If the store client determines that the license was signed by a trusted certificate, and the hardware identifications do match, then the store client can initiate the installation of the Application B license (272) on Client Machine 1 (240). This can include storing the Application B license (272) in a license cache on Client Machine 1 (240) so that the license need not be retrieved each time Application B (270) is launched on Client Machine 1 (240). Instead, when Application B (270) is launched on Client Machine 1 (240), the validity of the Application B license (272) can be checked. For example, in a system running Microsoft Windows® operating system, Windows® runtime can make sure that there is a valid license for Application B (270) each time the application is launched.

An Application A license (262) for Application A (260) can be retrieved and used in the same manner as the Application B license (272) for Application B (270). Other applications may also be licensed on Client Machine 1 (240) using the same techniques.

2. Purchasing and Roaming Feature Licenses to a First Machine

Feature license rights can also be purchased from the application store (210) so that feature licenses (282 and 284) can be obtained from the licensing server (220) by the client machines (240) and (250). Each feature license (282 and 284) can allow one or more additional features of the licensed application (260) to be used, although use of those additional features was not allowed by a basic application license (262 or 264).

Roaming feature licenses can be done in a manner that is similar to roaming application licenses. While Application A (260) is running on Client Machine 1 (240), user input may indicate a desire to unlock one or more features of Application A (260). For example, such features could be additional levels of a game, additional features for a graphic design application, additional features for a word processing application, etc. The user input requesting that features be unlocked could be received in various different scenarios or environments. For example, user input could be received by the application and passed on to a store client, or received more directly by the store client. For example, the store client could list features or sets of features to be unlocked after such a list was received from the application store (210).

The request for a feature license from Client Machine 1 (240) and the fulfillment of that request by the application store (210) and the licensing server (220) could be performed in the same manner as described above for application licenses. The received Application A feature license (282) can be bound to Client Machine 1 (240) using a hardware identifier from Client Machine 1 (240), as was described above with reference to the application licenses. When a feature license is first issued, the master license entry (232) for the corresponding application can be updated by the application store (210) to include an indication that the license rights of that user identification (234) for the application include rights for the additional features.

The application license may be a single document such as an XML document, and the feature license may be a single XML document. However, other configurations could be used. For example, the application license and the feature license may be included in a single document, such as a single XML document. In such a scenario, an updated combination application license/feature license could be downloaded each time rights for additional features were granted or revoked. As another example, the feature license could include multiple documents, with each license document allowing a different set of one or more features for the application.

3. Roaming Application and Feature Licenses to More Machines

As noted above, a license can be roamed to machines other than the one used to purchase the license. An example of this will now be discussed. A store client can be launched on Client Machine 2 (250), and user input can be received to logon using the same user identification (234) that was used for receiving the Application B license (272) on Client Machine 1 (240). Client Machine 2 (250) can then be linked to the user identification (234). The store client on Client Machine 2 (250) can connect to the licensing server (220) and retrieve a list of applications that are linked to the user identification (234) in master license entries (232) in the licensing database (230). This list of applications can be presented using a user interface at Client Machine 2 (250), and user input can be received requesting installation of one or more of the licensed applications on Client Machine 2 (250).

If the machine limit for the user identification (234) has not been exceeded, the store client on Client Machine 2 (250) can obtain the hardware identification for Client Machine 2 (250). The store client on Client Machine 2 (250) can send the list of desired applications and the hardware identification from Client Machine 2 (250) to the licensing server (220). The licensing server (220) can generate an application license for each application in the list and include the hardware identification binding in the license, to bind each license to Client Machine 2 (250). The licensing server (220) can also generate feature licenses for all the applications to which the user identification (234) has additional feature rights, as indicated in the master license entries (232). The feature licenses can also include hardware identification binding, to bind the feature licenses to Client Machine 2 (250). In the example illustrated in FIG. 2, the application licenses can include an application license (264) for Application A (260), a feature license (284) for Application A (260), and an application license (274) for Application B (270). All of these can be configured so that they are valid when used with Client Machine 2 (250), as indicated by matching the hardware identifications linked to the licenses with the hardware identification of the current machine when the licenses are installed on Client Machine 2 (250). When the applications (260 and 270) are launched on Client Machine 2 (250), Client Machine 2 (250) can make sure that each application has a valid license (264, 274, or 284), as discussed above with reference to Client Machine 1 (240).

This technique of roaming licenses to additional machines can be repeated for additional machines associated with the user identification (234) until the predetermined machine limit is reached. The count of the machines associated with the user identification (234) can be maintained by the licensing server (220), such as by using an entry linked to the user identification (234) in the licensing database (230). If the limit is reached, user input may be provided to deactivate one or more of the client machines, so that licenses on that machine will be deactivated/revoked. There may be some limits on the amount of such deactivations. For example, only one deactivation of a machine may be allowed per user identification in each thirty-day period.

The store client on each client machine linked to the user identification (234) may repeatedly connect to the licensing server (220) to synchronize any licensing changes linked to the user identification (234). For example, this synchronization may be performed automatically at set time intervals, automatically upon occurrence of specified events, and/or in response to user input requesting synchronization.

B. Master License Maintenance—Purchases, Refunds, and Deactivations

The application licenses can be managed based on the history of purchases linked to the user identification (234). For example, if a purchase of a license right is linked to the user identification (234), a master license entry (232) for that license can be created to link the application with the user identification (234). Licenses for that application can then be made available to the client machines linked to the user identification (234). If one or more additional license rights for the same application are purchased in transactions linked to the user identification (234), then the licensing server can maintain a count of how many license rights for that application are linked to the user identification (234), with the count increasing with each purchase of a license right for the application. For example, a user may have purchased a right for a word processing application individually, and then the user may purchase an office productivity suite that includes that same word processing application. If a license right is refunded (e.g., if the individual right for the word processing application is refunded after the office productivity suite is purchased), then the count can be decreased by one. The licensing server (220) can keep issuing licenses for an application linked to the user identification (234) as long as the license right count for that application and the user identification (234) is greater than zero. If the count goes to zero, then the license right can be revoked and the licensing server (220) can stop issuing licenses for that application linked to the user identification (234). If the count of license rights goes to zero, the licensing server (220) can also instruct client machines linked to that user identification (234) that have previously received licenses to that application to deactivate their licenses so that the application can no longer be used on those machines.

III. Software Application License Roaming Techniques

Several software application license roaming techniques will now be discussed. Each of these techniques can be performed in a computing environment. For example, each technique may be performed in a computer system that includes at least one processor or processing unit and at least one memory including instructions stored thereon that when executed by the at least one processor cause the at least one processor to perform the technique (one or more memories store instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
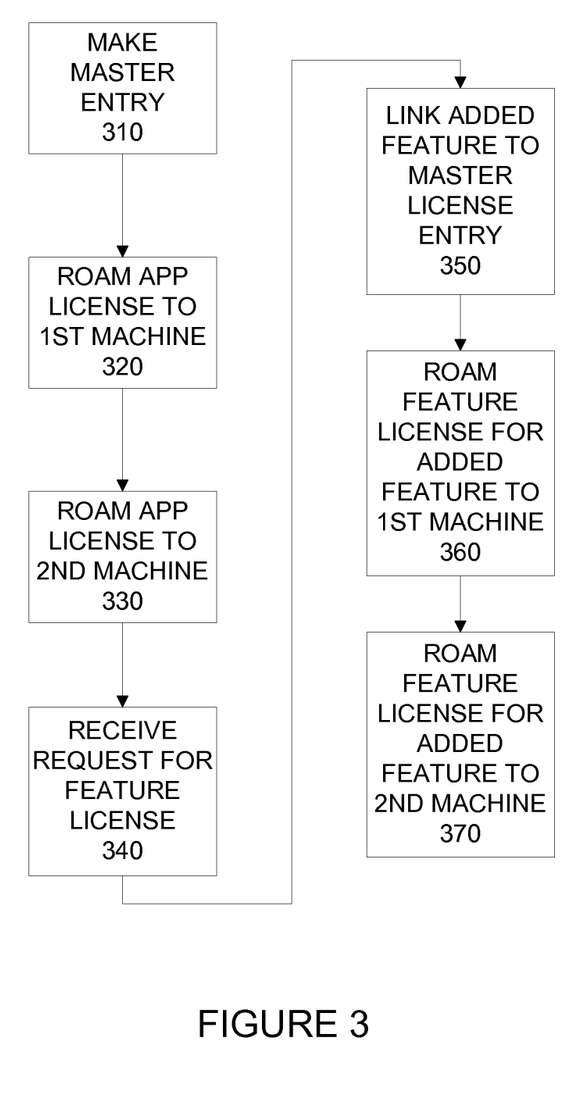
FIG. 3 is a flowchart of a software application license roaming technique.

Referring to FIG. 3, a software application license roaming technique will be described. The technique can include making (310) a master license entry that links a software application to a user identification. An application license for using the software application can be roamed (320) to a first computing machine linked to the user identification (e.g., a this link may occur when a login procedure has been performed at the first machine using the user identification). An application license for using the software application can also be roamed (330) to a second computing machine linked to the user identification. A request for a feature license for an added feature of the software application can be received (340). The request can be linked to the user identification, and the added feature can be a feature that was not allowed by the master license entry prior to receiving the request. For example, the request may be linked to a purchase transaction where the rights for the added feature are purchased. In response to the request, the added feature can be linked (350) to the master license entry, so that the master license entry indicates that the added feature is allowed. Additionally, a feature license for the added feature can be roamed (360) to the first machine, and a feature license for the added feature can be roamed (370) to the second machine.

Roaming (370) a feature license for the added feature to the second machine may be performed without user input at the second machine identifying the added feature. Roaming (330) an application license for using the software application to the second machine can be performed in response user input identifying the software application in a list of one or more software application license rights linked to the user identification (e.g., those with master license entries linking the application with the user identification). The technique may also include providing the application itself to the first machine and/or the second machine.

The technique may further include making a second master license entry that links a second software application to the user identification. An application license for using the second software application can be roamed to the first computing machine and/or the second computing machine.

The application license roamed (320) to the first machine can be bound to the first machine, and the application license roamed (330) to the second machine can be bound to the second machine. Additionally, the technique can include maintaining a count of machines to which licenses linked to the user identification have been roamed. A request can be received to roam an application license for using the software application to a third machine linked to the user identification. It can be determined whether the request to roam to the third machine is an allowable request. That determination can include determining whether granting the request would result in the count of machines exceeding a predetermined number of machines. If it is determined that the request to roam to the third machine is not allowable, then the technique can include refusing to roam a license for the software application to the third computing machine in response to the request. After this initial refusal, an opportunity may be provided to cure the reason for the request not being allowable. For example, if granting the request would result in the count of machines exceeding a predetermined number of machines, an opportunity may be provided to deactivate licenses on one or more machines, thereby decreasing the count of machines. If it is determined that the request to roam to the third machine is an allowable request, then the technique can include roaming a license for the software application to the third computing machine in response to the request.

The technique can include receiving a request to deactivate a license for the software application on a computing machine, granting the request to deactivate, and decreasing the count of machines to account for the grant of the request to deactivate. The technique may include determining whether the request to deactivate is allowable. This determination can include determining whether a predetermined number of deactivations of licenses linked to the user identification have been granted within a predetermined period of time. If the request to deactivate is allowable, then the request to deactivate can be granted and the count of machines can be decreased to account for the grant of the request to deactivate.

Figure 4:
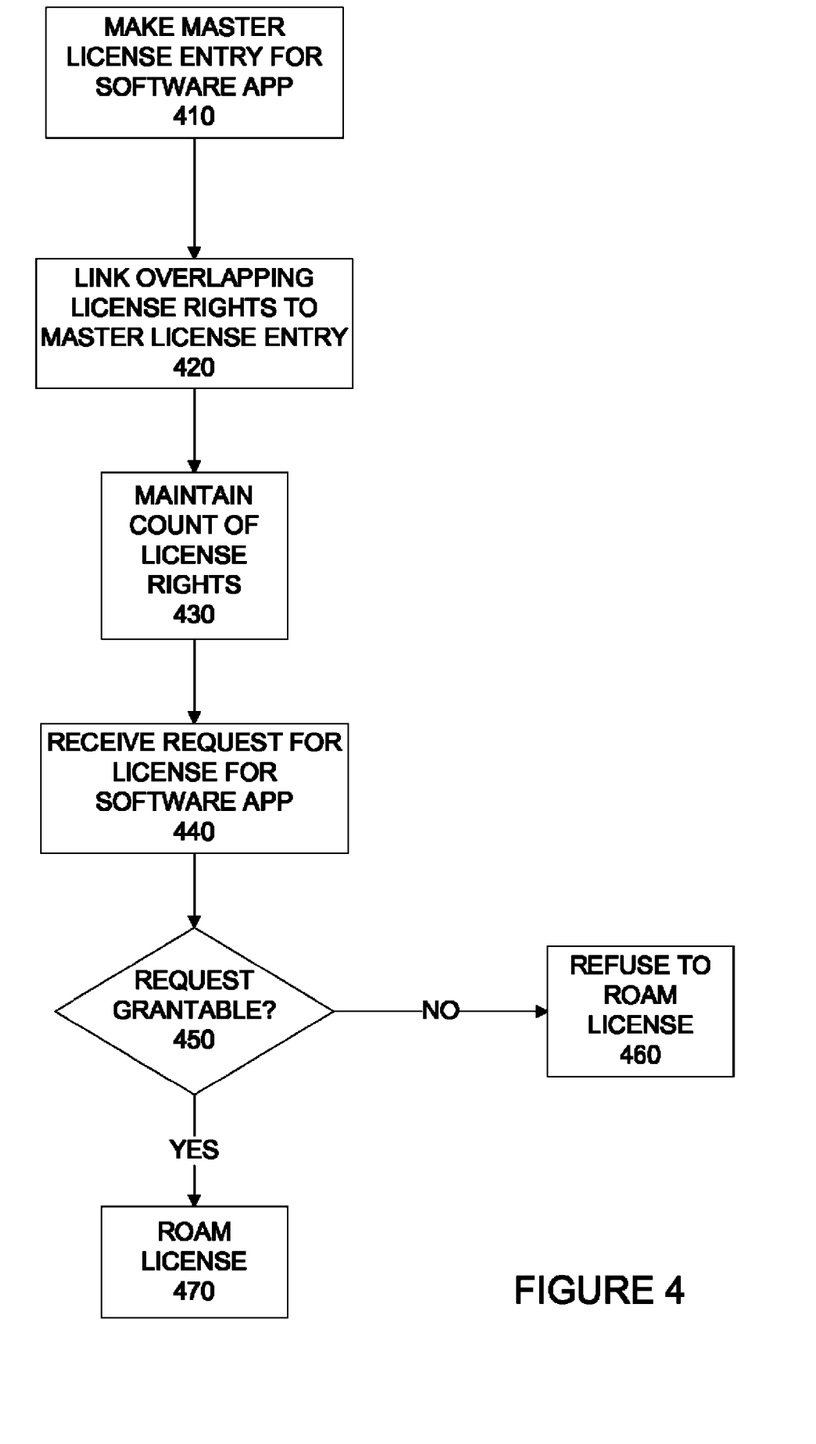
FIG. 4 is a flowchart of another software application license roaming technique.

Referring now to FIG. 4, another software application license roaming technique will be described. The technique can include making (410) a master license entry that links a software application identification to a user identification. Multiple overlapping license rights for the software application can be linked (420) to the master license entry. For example, the overlapping license rights might include an application license right that was purchased individually and another application license right for the same application that was purchased as part of a bundle. A count of how many license rights for the software application are linked to the master license entry can be maintained (430). A request for a license for the software application can be received (440) from a computing machine linked to the user identification. In response to the request, it can be determined (450) whether the request is an allowable request. If not, then the technique can include refusing (460) to roam a license for the software application to the computing machine in response to the request. If so, then the technique can include roaming (470) a license for the software application to the computing machine in response to the request. Roaming (470) a license for the software application can include automatically sending a license.

The technique can include receiving a second request for a license for the software application from a second computing machine linked to the user identification. In response to the second request, it can be determined whether the second request is allowable. This determination can include determining whether the count of license rights for the software application is greater than zero. If it is determined that the second request is not allowable, then the technique can include refusing to roam a license for the software application to the second computing machine in response to the second request. If it is determined that the second request is allowable, then the technique can include roaming a license for the software application to the second computing machine in response to the request.

The technique may further include receiving a request for a feature license for an added feature of the software application. The request for a feature license can be linked to the user identification, and the added feature can be a feature that was not allowed by the master license entry prior to receiving the request. The added feature can be linked to the master license entry, so that the master license entry indicates that the added feature is allowable. If it was determined that the first request for a license for the software application was allowable, then a feature license for the added feature can be roamed to the first machine. If it was determined that the second request for a license for the software application was allowable, then the technique can include roaming a feature license for the added feature to the second machine.

The technique can include refunding one or more license rights for the software application that are linked to the master license entry, as well as decreasing the count of license rights by how many license rights are refunded. The technique can further include determining whether decreasing the count of license rights results in the count of license rights dropping to zero. If so, then one or more licenses linked to the master license entry can be revoked.

Roaming (470) a license for the software application to the computing machine can include sending a license that is bound to the computing machine. Also, the technique can further include maintaining a count of how many computing machines have received licenses connected to the user identification. Determining (450) whether the request for a license for the software application is allowable can include determining whether the count of computing machines has already reached a predetermined maximum count.

Figure 5:
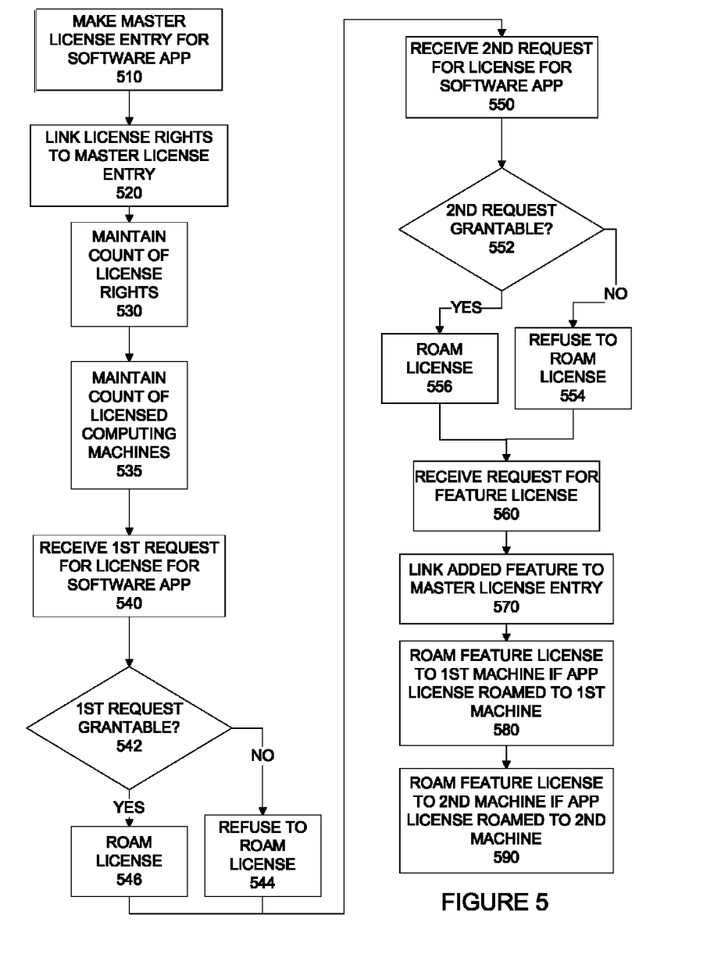
FIG. 5 is a flowchart of yet another software application license roaming technique.

Referring now to FIG. 5, yet another software application license roaming technique will be described. The technique can include making (510) a master license entry that links a software application to a user identification. One or more license rights for the software application can be linked (520) to the master license entry. A count of how many license rights for the software application are linked to the user identification can be maintained (530). Additionally, a count of how many computing machines have active licenses linked to the user identification can be maintained (535). A first request for a license for the software application from a first computing machine linked to the user identification can be received (540). It can be determined (542) whether the first request is an allowable request. This determination (542) can include determining whether the count of license rights is greater than zero and determining whether the count of computing machines is less than a predetermined maximum number. If it is determined that the first request is not allowable, then the technique can include refusing (544) to roam a license for the software application to the first computing machine in response to the request. If it is determined that the first request is allowable, then the technique can include roaming (546) a license for the software application to the first computing machine in response to the first request. A second request for a license for the software application can be received (550) from a second computing machine linked to the user identification. It can be determined (552) whether the second request is allowable. This determination can include determining whether the count of license rights is greater than zero and determining whether the count of computing machines is less than the predetermined maximum number. If it is determined that the second request is not allowable, then the technique can include refusing (554) to roam a license for the software application to the second computing machine in response to the request. If it is determined that the second request is allowable, then the technique can include roaming (556) a license for the software application to the second computing machine in response to the second request. Moreover, a request for a feature license for an added feature of the software application can be received (560). The feature license request can be linked to the user identification, and the added feature can be a feature that was not allowed by the master license entry prior to receiving (560) the feature license request. The added feature can be linked (570) to the master license entry, so that the master license entry indicates that the added feature is allowed. Additionally, if a license for the software application has been roamed to the first machine, then a feature license for the added feature can be roamed (580) to the first machine. Likewise, if a license for the software application has been roamed to the second machine, then a feature license for the added feature can be roamed (590) to the second machine.

Maintaining (535) the count of computing machines can include increasing the count of computing machines when a license for the software application that is linked to the user identification is sent to a computing machine that is not currently included in the count. Maintaining (535) the count of computing machines can also include decreasing the count of computing machines when any active licenses to the software application that are linked to the user identification on a computing machine included in the count are deactivated. Also, maintaining (530) the count of license rights can include increasing the count of license rights when a license right for the software application that is linked to the master license entry is granted (e.g., by being purchased). Maintaining (530) the count of license rights can also include decreasing the count of license rights when a license right for the software application that is linked to the master license entry is refunded.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
    making a master license entry that links a software application to a user identification;
        roaming, by a server, application licenses for using the software application on computing machines linked to the user identification by:
            generating, by the server, a first application license for using the software application on a first computing machine linked to the user identification, the first application license being bound to the first machine;
            transmitting, by the server to the first machine, the first application license:
            receiving, by the server, a request for use of the software application on a second computing machine linked to the user identification;
            generating, by the server, a second application license based on a determination that the request for use of the software application on the second computing machine is allowable; and
            transmitting, by the server to the second computing machine, the second application license;
        receiving, by the server, a request for a feature license for an added feature of the software application, the request being linked to the user identification, and the added feature being a feature that was not allowed by the master license entry prior to receiving the request;
        in response to the request, linking, by the server, the added feature of the software application to the master license entry, so that the master license entry indicates that the added feature is allowed;
        roaming, by the server, feature licenses for using the added feature of the software application on the computing machines linked to the user identification by:
            generating, by the server, a first feature license for using the added feature of the software application on the first computing machine;
            transmitting, by the server to the first machine, the first feature license;
            receiving, by the server, a request for use of the added feature of the software application on the second computing machine;
            generating, by the server, a second feature license of the software application; and
            transmitting, by the server to the second computing machine, the second feature license;
        maintaining, by the server, a count of machines to which licenses linked to the user identification have been roamed;
        receiving, by the server, a request to deactivate a license for the software application on a computing machine;
        determining, by the server, whether the request to deactivate is allowable, including determining whether a predetermined number of deactivations of machines linked to the user identification have been granted within a predetermined period of time; and
        granting, by the server, the request to deactivate based on the determining whether the request to deactivate is allowable by deactivating the license associated with the deactivation request and decreasing the count of machines to which licenses linked to the user identification have been roamed.

2. The method of claim 1, wherein roaming the second feature license for the added feature to the second machine is performed without user input at the second machine identifying the added feature.

3. The method of claim 1, wherein roaming the second application license for using the software application to the second machine is performed in response to user input identifying the software application in a list of one or more software application license rights linked to the user identification.

4. The method of claim 1, further comprising providing the application to the first machine.

5. The method of claim 1, wherein the software application is a first software application, the master license entry is a first master license entry, and the method further comprises:
- making a second master license entry that links a second software application to the user identification;
- roaming a first application license for using the second software application to the first computing machine; and
- roaming a second application license for using the second software application to the second computing machine.

6. The method of claim 1, wherein the first application license roamed to the first machine is bound to the first machine, wherein the second application license roamed to the second machine is bound to the second machine.

7. The method of claim 6, further comprising:
- receiving a request to roam an application license for using the software application to a third computing machine linked to the user identification;
- determining whether the request to roam to the third machine is an allowable request, the determination of whether the request to roam to the third machine is an allowable request including determining whether granting the request to roam to the third machine would result in the count of machines exceeding a count of license rights for the software application linked to the user identification;
- if it is determined that the request to roam to the third machine is not allowable, then refusing to roam a license for the software application to the third computing machine in response to the request; and
- if it is determined that the request to roam to the third machine is an allowable request, then roaming a third application license for the software application to the third computing machine in response to the request.

8. The method of claim 6, further comprising:
- receiving a request to deactivate a license for the software application on a computing machine;
- granting the request to deactivate; and
- decreasing the count of machines to account for the grant of the request to deactivate.

9. The method of claim 1, further comprising:
- maintaining a count of license rights for the software application linked to the user identification;
- refunding one or more license rights for the software application that are linked to the user identification; and
- decreasing the count of license rights by how many license rights are refunded.

10. A computer system comprising:
- at least one processing unit; and
- at least one memory comprising instructions stored thereon that when executed by the at least one processing unit cause the at least one processing unit to perform acts comprising:
  - making a master license entry that links a software application to a user identification;
  - roaming, by a server, application licenses for using the software application on computing machines linked to the user identification by:
    - generating, by the server, a first application license for using the software application on a first computing machine linked to the user identification, the first application license being bound to the first machine;
    - transmitting, by the server to the first machine, the first application license;
    - receiving, by the server, a request for use of the software application on a second computing machine linked to the user identification;
    - generating, by the server, a second application license based on a determination that the request for use of the software application on the second computing machine is allowable; and
    - transmitting, by the server to the second computing machine, the second application license;
  - receiving, by the server, a request for a feature license for an added feature of the software application, the request being linked to the user identification, and the added feature being a feature that was not allowed by the master license entry prior to receiving the request;
  - in response to the request, linking, by the server, the added feature of the software application to the master license entry, so that the master license entry indicates that the added feature is allowed;
  - roaming, by the server, feature licenses for using the added feature of the software application on the computing machines linked to the user identification by:
    - generating, by the server, a first feature license for using the added feature of the software application on the first computing machine;
    - transmitting, by the server to the first machine, the first feature license;
    - receiving, by the server, a request for use of the added feature of the software application on the second computing machine;
    - generating, by the server, a second feature license of the software application; and
    - transmitting, by the server to the second computing machine, the second feature license;
  - maintaining, by the server, a count of machines to which licenses that are for the software application and are linked to the user identification have been roamed;
  - receiving, by the server, a request to deactivate a license for the software application on a computing machine and to decrease the count of machines;
  - determining, by the server, whether the request to deactivate and to decrease the count of machines is allowable, including determining whether a predetermined number of deactivations of licenses linked to the user identification and corresponding decreases in the count of machines have been granted within a predetermined period of time; and
  - granting, by the server, the request to deactivate based on the determining whether the request to deactivate is allowable by deactivating the license associated with the deactivation request and decreasing the count of machines to which licenses linked to the user identification have been roamed.

11. The system of claim 10, wherein roaming the second feature license for the added feature to the second machine is performed without user input at the second machine identifying the added feature.

12. The system of claim 10, wherein roaming the second application license for using the software application to the second machine is performed in response to user input identifying the software application in a list of one or more software application license rights linked to the user identification.

13. The system of claim 10, wherein the acts further comprise providing the application to the first machine.

14. The system of claim 10, wherein the software application is a first software application, the master license entry is a first master license entry, and the acts further comprise:
- making a second master license entry that links a second software application to the user identification;

roaming a first application license for using the second software application to the first computing machine; and
roaming a second application license for using the second software application to the second computing machine.

15. The system of claim 10, wherein the first application license roamed to the first machine is bound to the first machine, wherein the second application license roamed to the second machine is bound to the second machine.

16. The system of claim 15, wherein the acts further comprise:
receiving a request to roam an application license for using the software application to a third computing machine linked to the user identification;
determining whether the request to roam to the third machine is an allowable request, the determination of whether the request to roam to the third machine is an allowable request including determining whether granting the request to roam to the third machine would result in the count of machines exceeding a predetermined number of machines;
if it is determined that the request to roam to the third machine is not allowable, then refusing to roam a license for the software application to the third computing machine in response to the request; and
if it is determined that the request to roam to the third machine is an allowable request, then roaming a third application license for the software application to the third computing machine in response to the request.

17. The system of claim 15, wherein the acts further comprise:
receiving a request to deactivate a license for the software application on a computing machine;
granting the request to deactivate; and
decreasing the count of machines to account for the grant of the request to deactivate.

18. The system of claim 10, wherein the predetermined number of deactivations of licenses linked to the user identification and corresponding decreases in the count of machines is a predetermined number of deactivations that would each allow one or more licenses to be moved between computing machines.

19. A computer-implemented method, comprising:
making a master license entry that links a software application to a user identification;
roaming, by a server, application licenses for using the software application on computing machines linked to the user identification by:
generating, by the server, a first application license for using the software application on a first computing machine linked to the user identification, the first application license being bound to the first machine;
transmitting, by the server to the first machine, the first application license;
receiving, by the server, a request for use of the software application on a second computing machine linked to the user identification;
generating, by the server, a second application license based on a determination that the request for use of the software application on the second computing machine is allowable; and
transmitting, by the server to the second computing machine, the second application license;
receiving, by the server, a request for a feature license for an added feature of the software application, the request being linked to the user identification, and the added feature being a feature that was not allowed by the master license entry prior to receiving the request;
in response to the request, linking, by the server, the added feature of the software application to the master license entry, so that the master license entry indicates that the added feature is allowed;
roaming, by the server, feature licenses for using the added feature of the software application on the computing machines linked to the user identification by:
generating, by the server, a first feature license for using the added feature of the software application on the first computing machine;
transmitting, by the server to the first machine, the first feature license;
receiving, by the server, a request for use of the added feature of the software application on the second computing machine;
generating, by the server, a second feature license of the software application; and
transmitting, by the server to the second computing machine, the second feature license;
maintaining, by the server, a count of machines to which licenses linked to the user identification have been roamed;
receiving, by the server, a request to deactivate a license for the software application on a computing machine and to decrease the count of machines;
determining, by the server, whether the request to deactivate and to decrease the count of machines is allowable, including determining whether a predetermined number of deactivations of licenses linked to the user identification and corresponding decreases in the count of machines have been granted within a predetermined period of time; and
granting, by the server, the request to deactivate based on the determining whether the request to deactivate is allowable by deactivating the license associated with the deactivation request and decreasing the count of machines to which licenses linked to the user identification have been roamed.

20. The system of claim 18, predetermined number of deactivations that would each allow one or more licenses to be moved between computing machines is a predetermined number of deactivations that would each allow a license to the software application to be moved between computing machines.

* * * * *